Figure 1:
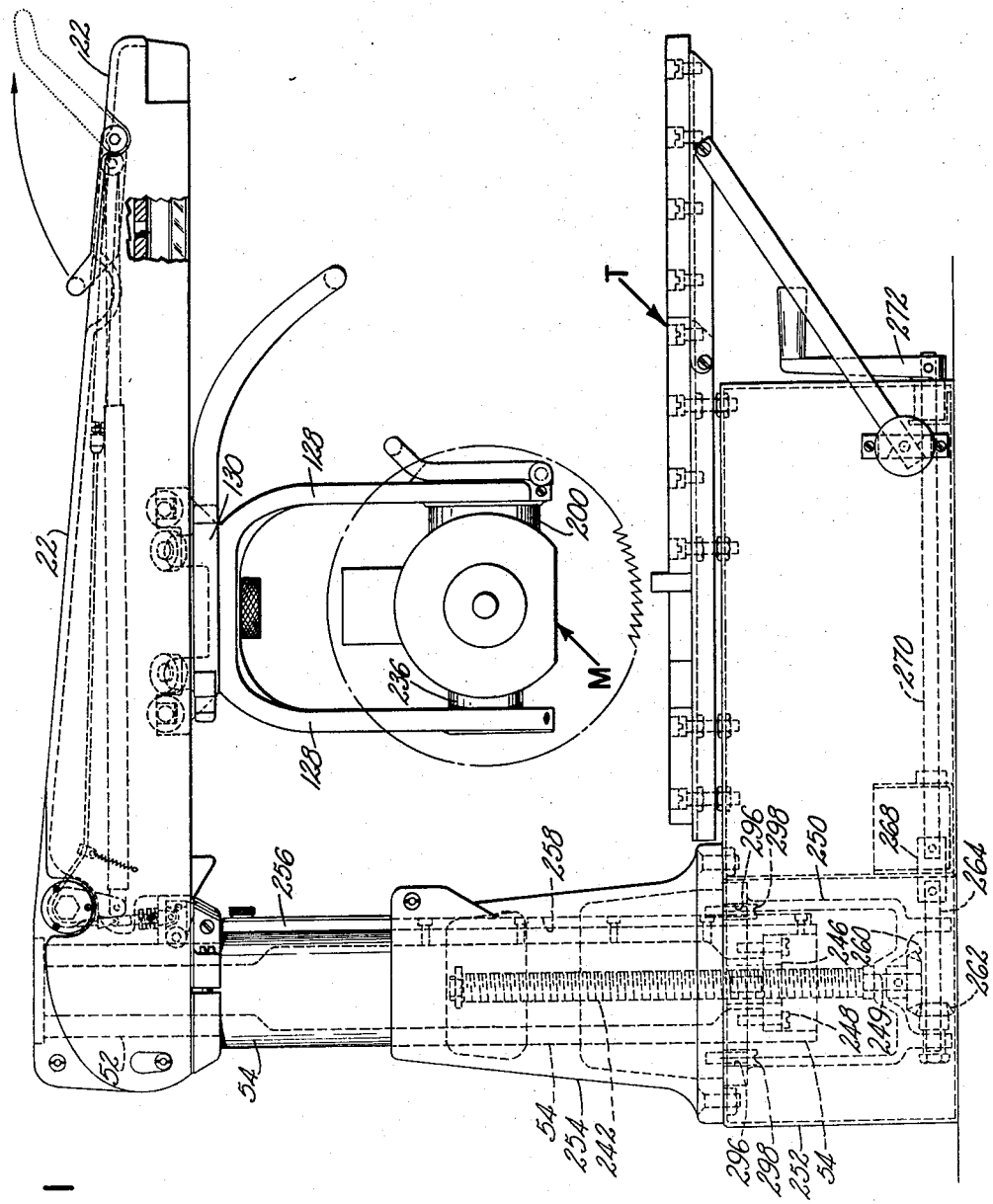

Nov. 8, 1960 H. C. CASSEY 2,959,200
TOOL ELEVATING DEVICE
Original Filed March 8, 1957 2 Sheets-Sheet 1

INVENTOR
HAROLD C. CASSEY
BY Bradley Cohn
ATTORNEY

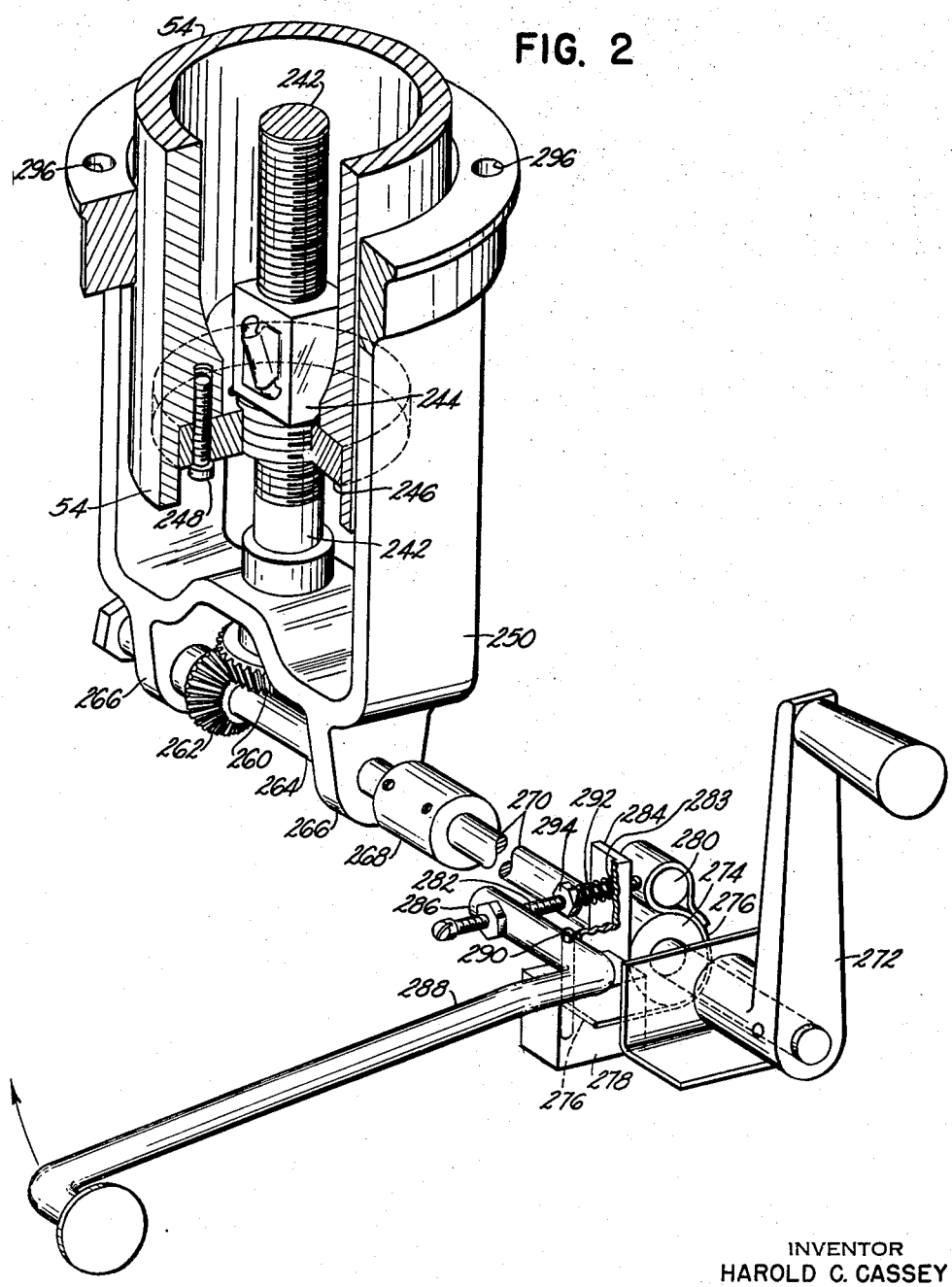

United States Patent Office 2,959,200
Patented Nov. 8, 1960

2,959,200
TOOL ELEVATING DEVICE

Harold C. Cassey, Landisville, Pa., assignor, by mesne assignments, to De Walt, Inc., a corporation of Delaware Original application Mar. 8, 1957, Ser. No. 644,864. Divided and this application Jan. 30, 1958, Ser. No. 712,194

7 Claims. (Cl. 143—35)

This is a division of my co-pending application, Serial No. 644,864, filed March 8, 1957.

This invention relates to sawing machines, and more particularly to that type of sawing machine known as the radial arm saw in which the sawing mechanism is suspended above the work table by a cantilever arm.

In this type of tool the cantilever arm is pivotally mounted on an elevating standard and the sawing mechanism is mounted on an anti-friction carriage movable along the arm.

It is an object of the invention to provide an improved elevating means adaptable to both manual and power operation incorporated in such a tool.

It is a further object of the invention to provide a self-aligning elevating means to facilitate assembly.

It is still another object of the invention to provide a telescoping vertical standard elevating drive means which is self-adjusting as to axial alignment thereby obviating the need of high tolerance expensive machinery in the manufacture of several of the parts.

It is an object of the invention to provide an elevating assembly securable to the base of the vertical guide standard in a manner to permit shifting to provide alignment despite tolerance variations between the assembly and the guide means. It is thus an object of the invention to produce accuracy by a guide means independent of the elevating means, per se.

The novel features which I believe to be characteristic of my invention are set forth with particularity in the appended claims. My invention itself, however, both as to its organization and method of operation may be understood by reference to the following description taken in connection with the accompanying drawings in which:

Fig. 1 is a side elevation of a radial arm saw illustrating the novel column elevating mechanism and brake; and Fig. 2 is an isometric view, partly in section, illustrating the improved column elevating mechanism in conjunction with the elevating brake.

Referring to the drawings, Fig. 1 shows a radial arm tool incorporating the invention in its elevating standard. The standard 54 supporting the radial arm 22 is raised and lowered by means of a vertical threaded spindle 242 (Figs. 1 and 2) which engage a conventional ball nut 244.

Ball nut 244 is secured to a disc 246 which in turn by means of screws 248 (Fig. 2) is mounted in a recess at the bottom end of the vertical standard or column 54. The lower end of spindle 242 is rotatably supported by a suitable bearing in bracket 250 secured to the lower side of a base stand 254. The vertical standard 54 is slidably supported in a hollow base stand or bearing member 254 mounted on the top side of a frame 252. To the standard 54 is secured a key 256 which runs the entire length of said standard. Key 256 engages with a suitable keyway 258 in the stand 254 and is employed for the purpose of preventing the standard 54 from turning. To the bottom end of spindle 242 is secured a bevel gear 260 (Fig. 2) meshing with a bevel gear 262 mounted on a horizontal shaft 264 which is rotatably supported in bearing lugs 266 projecting from the bottom portion of bracket 250. To one end of the shaft 264 is secured a suitable coupling 268 which may be engaged with the shaft 270 of a crank 272 so that the turning of said crank will effect the turning of the vertical spindle 242. Since said spindle by means of the ball nut 244 and disc 246 is connected to the vertical standard 54 which in turn on its top portion carries the radial arm 22, a clockwise or anti-clockwise turning will result in a raising or lowering of said radial arm 22. If desired the manually operated crank 272 may be replaced by a suitable reversible reduction gear motor (not shown).

Due to the employment of the practically frictionless ball nut 244 in conjunction with the weight of the standard 52 and radial arm 22 acting upon the same, the spindle 242 may have a tendency to turn by itself and effect and permit a downward travel of the radial arm 22. To guard against such undesired movement the elevating system is provided with a braking device as illustrated in Fig. 2 of the drawings. The brake device consists of a drum 274 secured to the shaft 270 of the elevating crank. It could likewise be secured to the shaft of a reversible gear reduction motor if desired. However, a gear reduction motor itself serves as a brake and hence no further braking means is usually necessary.

Drum 274 is in engagement with a steel band 276 which tends to bind and lock itself to the drum upon downward or counterclockwise rotation. Band 276 on one end is suitably secured to a bracket 278 while the other end is anchored to a round bar 280 which is secured to the end of a threaded stud 294 which protrudes through a suitable hole 283 in an upright 284. A tension spring 292 confined between the head of threaded stud 294 and the upright 284 is employed for the purpose of providing a yieldable support for bar 280 and consequently brake 276. Screw 282 is adjustably held by an arm 286 of a suitable bell crank lever 288 pivotally secured to bracket 278 by means of a stud 290. One end of the screw 282 contacts the head of the threaded stud 294. Adjustment of the stud 294 varies the tension of the brake band 276. The band is released from the drum by simply pressing the bell crank lever 288 in the direction of the arrow indicated in Fig. 2. The elevating mechanism is rotated to lower the standard 54 when the brake pressure is released by pressing lever 288. The lever may also be pressed for raising the standard but this is not generally necessary since rotation in the right hand direction as shown in Fig. 2 obviously tends to release the brake independently of lever 288.

The elevating system illustrated in Figs. 1 and 2 is designed in such a manner that costly spotting and aligning work during assembly operation is eliminated. The elevator bracket 250 and its connecting parts, including the standard 54, are assembled separately to the bottom of the stand 254 and then placed upon the frame 252. The holes 296 for the mounting screws 298 in the upper flange of bracket 250 are made large enough to permit slight shifting of the unit if such shifting is necessary. The structure is therefore self-aligning and high tolerance expensive machining is obviated.

The standard 54 supports the radial arm 22 along which slides the carriage 130 having a yoke 128 supporting the trunnions 236, 200 of the motor M. To the frame 252 there is further secured table T for supporting a workpiece which may be operated upon by a tool secured to the arbor shaft of the motor M.

I claim:
1. In a power tool having a base and a work supporting table on said base, a tool supporting and elevating structure secured to said base and positioned rearwardly of said work supporting table, said structure including a vertical cylindrical column, a cantilever arm secured to the top of said column and extending across and spaced from said work supporting table, said structure also comprising a vertically disposed bottom bracket member, said bottom bracket member at its lower end rotatably supporting a vertically extending threaded shaft, and at its upper end a peripheral bolting flange, an upper bearing member secured to the bolting flange of said bottom bracket member, said members being laterally adjustable with respect to each other, at least one of said members being secured to said base, said members receiving in telescoping relationship said vertical cylindrical column, and a nut on said threaded member secured to said telescoping column so that rotation of said vertical threaded shaft will raise and lower said nut and said telescoping column therewith.

2. In a power tool having a base and a work supporting table on said base, a tool supporting and elevating mechanism secured to said base and positioned rearwardly of said work supporting table, said mechanism including a vertical cylindrical standard, a cantilever arm secured to the top of said standard and extending across and spaced from said work supporting table, said mechanism also comprising a bottom bracket member, said bottom bracket member rotatably supporting a vertically extending threaded shaft, an upper bearing member secured to said bottom bracket member, said upper member slidably receiving said vertical cylindrical standard, a nut on said threaded member secured to the lower end of said standard so that rotation of said vertical threaded shaft will raise and lower said nut and said standard therewith, said upper bearing member being adjustable transversely with respect to said bottom bracket member to properly guide said sliding standard in axial alignment with said threaded shaft journaled in said bottom bracket member, and means secured to said bottom bracket member to rotate said threaded shaft.

3. In a power tool having a base and a work supporting table on said base, a tool supporting and elevating structure secured to said base and positioned rearwardly of said work supporting table, said structure including a vertical column, a cantilever arm secured to said column and extending across and spaced from said work supporting table, said structure also comprising a lower bearing member, said bearing member rotatably supporting a vertically extending threaded shaft, an upper bearing member secured to said lower bearing member, said upper bearing member receiving in telescoping relationship said vertical column, a nut on said threaded shaft secured to said telescoping column so that rotation of said vertical threaded shaft will raise and lower said nut and said telescoping column therewith, said upper bearing member being adjustable transversely with respect to said lower bearing member to properly guide said reciprocating standard in axial alignment with said shaft journaled in said lower bearing member, and means mounted in said lower bearing member to rotate said threaded shaft, said means including a substantially horizontal shaft, a bevel gear linkage between said horizontal shaft and said vertical shaft so that rotation of said horizontal shaft will rotate said vertical shaft, a crank secured on the end of said horizontal shaft, and brake means engaging said horizontal shaft, said brake means comprising a brake drum secured to said horizontal shaft, a stationary bracket, a brake band engaging a portion of said drum and secured to said stationary bracket, and a lever mounted on said bracket and movable to release said brake band from said brake drum.

4. In an elevating mechanism for raising and lowering a tool support, a vertically disposed bottom bearing member, a vertically extending threaded shaft rotatably mounted in said bottom bearing member and extending upwardly therethrough, an upper bearing member securable to the upper end of said bottom bearing member, said upper bearing member receiving in telescoping relationship a vertical column, a nut on said threaded shaft secured to said telescoping column so that rotation of said shaft will raise and lower said nut and said telescoping column, said upper bearing member being adjustable transversely with respect to said bottom member to properly guide said telescoping column in axial alignment with said shaft journaled in said bottom bearing member, and means mounted in said bottom bearing member to rotate said threaded shaft.

5. In an elevating mechanism for raising and lowering a tool support, a vertically disposed bottom bearing member, a vertically extending threaded shaft mounted in said bottom bearing member and extending upwardly therethrough substantially through the center thereof, an upper bearing member securable to said bottom bearing member, said upper bearing member receiving in telescoping relationship a vertical column, a nut on said threaded shaft engaging said telescoping column so that relative rotation between said shaft and said nut will raise and lower said nut and said telescoping column, said upper bearing member being adjustable transversely with respect to said bottom bearing member to properly guide said telescoping column in axial alignment with said shaft journaled in said bottom bearing member.

6. A device substantially as set forth in claim 5 further characterized in that said column is non-rotatable in said upper bearing member.

7. In an elevating mechanism for raising and lowering a tool support, a vertically disposed bottom bearing member, a vertically extending threaded shaft rotatably mounted in said bottom bearing member and extending upwardly therethrough, an upper bearing member securable to the upper end of said bottom bearing member, said upper bearing member receiving in telescoping relationship a vertical column, a nut on said threaded shaft secured to said telescoping column so that rotation of said shaft will raise and lower said nut and said telescoping column, a crank shaft mounted in said bottom bearing member for rotating said threaded shaft, a brake drum secured to said crank shaft, and a brake band frictionally engaging said drum, said brake band being biased to tighten on said brake drum when said brake drum and crank shaft are rotated in the direction that will lower said column and said brake band is relieved when said drum and said crank shaft are rotated in the opposite direction.

References Cited in the file of this patent
UNITED STATES PATENTS

| 1,846,641 | Hedgpeth | Feb. 23, 1932 |
| 2,590,093 | Duerr | Mar. 25, 1952 |
| 2,596,007 | Casaroll | May 6, 1952 |
| 2,781,186 | Harbers et al. | Feb. 12, 1957 |